June 26, 1956   J. V. FITZGERALD ET AL   2,752,506
METER FOR HIGH RADIATION FLUXES
Filed Jan. 17, 1952
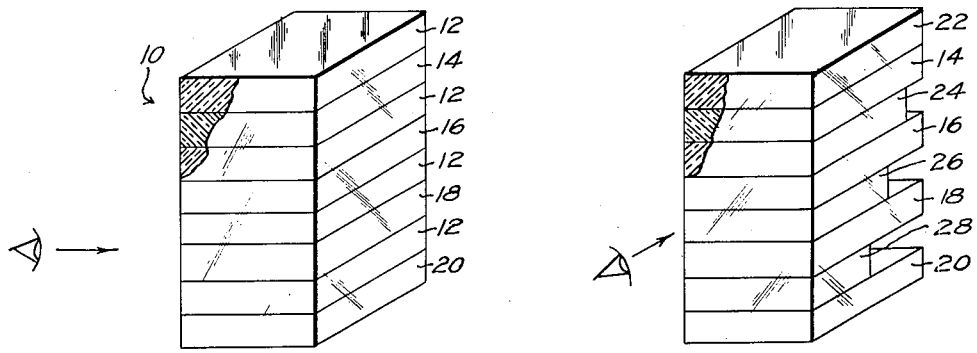
*Fig. 1*          *Fig. 2*
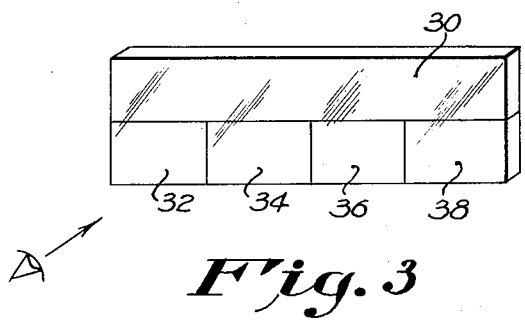
*Fig. 3*
John V. Fitzgerald,
George S. Bachman and
Kenneth M. Laing,
INVENTORS.
BY Oscar L. Spencer
ATTORNEY

United States Patent Office 2,752,506
Patented June 26, 1956

2,752,506

METER FOR HIGH RADIATION FLUXES

John V. Fitzgerald, George S. Bachman, and Kenneth M. Laing, New Kensington, Pa., assignors to Pittsburgh Plate Glass Company Application January 17, 1952, Serial No. 266,952

11 Claims. (Cl. 250—83)

This invention pertains to devices for measuring, indicating and recording radiation fluxes, and more particularly for the relatively hard radiations such as those produced by nuclear reactions. Such devices have applications not only in connection with atomic warfare, but for use near nuclear reactors or other sources of strong high-frequency radiation or particle emission.

The measurement of radiant energy of the type with which the present invention is concerned successfully has been accomplished by various systems. Geiger counters, scintillation counters and various other devices have been employed, and for accurate measurement the use of such relatively complicated apparatus is fully justified. However, the size, weight, complexity and expense of measuring devices of this type render them unsuitable for use where portability and low cost are desirable.

It has also been proposed to monitor radiations by photographic methods, and various types of wearable badges or dosimeters have been developed in which a photographically sensitive material is used in combination with shields or flux converters so as to be sensitive to the suspected radiations. While such arrangements have had some success, they have required periodic photographic development of the sensitive element and a relatively complicated measuring procedure in order to produce a usable indication or record.

It is a principal object of the present invention to provide an extremely simple and inexpensive metering device which is so small and light that it can readily be worn or carried by the user, and which will constantly afford an immediate indication of the degree to which the device has been exposed to hard radiations. The invention accomplishes this aim by a combination of elements which afford the desired indication without the necessity of carrying out any processing steps upon the sensitive material, and which will thus provide a record which can be read instantaneously, and preserved indefinitely, if desired, to afford a permanent record of the integrated radiation flux to which the device has been exposed.

While the device of the present invention is especially suitable for use as a portable dosimeter, it will be clear from the description which follows that it is equally useful for other applications, for example, where it is desired to record the integrated radiation flux at a particular fixed location, rather than merely that to which a particular person has been exposed.

In general, the invention is based upon the known fact that certain types of glasses are directly discolored upon being irradiated, by the harder radiations, and that the degree of discoloration is a function of the integrated amount of irradiation. In order for this principle to be applied to the measurement of radiations, it is necessary that some comparison standard of color be provided, because while the human eye is a fairly accurate judge of color match, as between two specimens, it is an exceedingly poor judge of color or density of coloration in the absolute sense. On the other hand, it is necessary that the chromatic hue or tint of the comparison standard closely approximate the discoloration produced by irradiation in the sensitive material, in order for the eye to judge as to equality between the degree of coloration of the sensitive material and that of the comparison standard. At the same time, it is absolutely essential that the comparison standard material be itself relatively immune to discoloration, if the direct-reading feature is to be achieved.

The present invention, then provides a measuring device in which a radiation-sensitive glass is combined with graded standard-color glasses serving as comparison standards which can match the discoloration produced in the sensitive material and which are themselves insensitive to the radiations to be measured. Moreover, the invention provides glass standards of comparison which can be controlled in manufacture as to their color density, whereby an estimation may be made of the absolute integrated intensity of the radiation to which the sensitive material has been exposed.

The above and other objects and advantages of the invention are realized in a way which will best be understood by reference to the following detailed specification of certain preferred embodiments, taken in connection with the appended drawings, in which:

Fig. 1 is a perspective view of one embodiment of the invention,

Fig. 2 is a similar view of a modified form of the invention, and

Fig. 3 is a plan view of a further modification.

It is well known that certain glasses have the property of becoming discolored when exposed to X-radiation, gamma rays and the like. For example, glass having a composition of 20% $Na_2O$, 20% $CaO$ and 60% $SiO_2$, known as a soda-lime-silica glass, when exposed to such radiations, turns brownish, the depth of color being related to the total amount of such radiation to which the glass has been exposed. It is also known that the same brownish color can be obtained by adding nickel oxide to this same soda-lime-silica glass. However, when the glass containing the nickel oxide is exposed to X-rays or other hard radiation, it gets still darker, so that while such material would afford a color match as between the sensitive base glass and the comparison "standard," the latter itself would be so altered in color by exposure that it would no longer provide a reliable standard of color for comparison purposes.

It has been found that the brownish color of soda-lime-silica glass to which nickel oxide has been added can be rendered constant (that is, insensitive to radiation), by the addition to the composition of a color-change inhibitor material such as cerium oxide. Thus, it becomes possible to prepare standard color glasses containing varying amounts of nickel oxide to provide a range of brownish discolorations of the desired type, and which will retain their predetermined color by virtue of the presence of cerium oxide therein. Such a range of standard color glasses can be prepared by adding to the soda-lime-silica glass mentioned above the following proportions of nickel oxide and cerium oxide:

No. 1 standard color glass, 0.01% NiO, 1% $CeO_2$
No. 2 standard color glass, 0.05% NiO, 1% $CeO_2$
No. 3 standard color glass, 0.10% NiO, 1% $CeO_2$
No. 4 standard color glass, 0.20% NiO, 1% $CeO_2$ These standard glasses have a brownish color of a depth depending upon the nickel oxide content, and retain their predetermined color despite exposure to radiation. The No. 1 standard color glass had a color which was substantially equal to that produced by an exposure of the sensitive glass amounting to $10^4$ Roentgens of radiation produced by 200 kv. X-rays. An exposure of $10^5$ Roentgens produced a color in the sensitive glass which was deeper than the color of No. 2 standard color glass but lighter than the color of No. 3 standard color glass. Greater irradiations of the sensitive glass produce colors corresponding to higher contents of nickel oxide in the comparison standard glasses.

It is also possible to utilize a radiation sensitive glass containing reduced manganese and a series of color comparison glasses formed of a potassium barium borosilicate glass to which has been added varying amounts of nickel oxide. Radiation turns the sensitive glass purple, again the intensity or depth of color being dependent upon the amount of radiation to which the glass has been exposed. The standard glasses possess a range of purple colorations dependent upon the concentrations of nickel therein. As before the standard glasses should also contain cerium oxide to render them insensitive to radiation.

A colorless glass having a calculated composition of 20% $Na_2O$, 20% CaO, 59.5% $SiO_2$, 0.2% $MnO_2$ and 0.2% of $NH_4Cl$ will exhibit the desired color change upon radiation.

The standard color comparison glasses have the following calculated compositions:

| | Per cent by weight |
|---|---|
| $SiO_2$ | 54 |
| BaO | 16 |
| $K_2O$ | 16 |
| $B_2O_3$ | 12 |
| CeO | 2 |
| NiO | 0.005 to 0.10 |

It has been found that the radiation induced purple color in the manganese containing sensitive glass is somewhat more permanent and resistant to fading than the radiation induced brown color in the soda-lime-silica glass. It has also been found possible to discern slighter color variations in the purple tone than in the browns.

In order to provide a unitary device suitable for the purposes of the invention and applying the principles just described, an assembly such as that shown in Fig. 1 of the drawings may be utilized. In that figure, numeral 10 designates generally a radiation meter built up of alternate layers of the sensitive glass and the respective standard color glasses. Numeral 12 designates the pieces of sensitive glass, and in between such layers 12 are placed standard color glasses 14, 16, 18 and 20, these having compositions corresponding to standard color glasses Nos. 1 to 4 indicated above. The successive layers may have dimensions, for example, of ½ by ½ by ⅛ inch., and are cemented together with a soluble cellulose cement or other suitable material, so that the device 10 can be handled, worn or carried as a single instrumentality.

All of the layers of glass comprising the device 10 will be exposed equally to hard radiations present in their vicinity, and the alternate layers of sensitive glass 12 will therefore all achieve substantially the same brownish or purple color as one another. The intervening layers of insensitive glass, however, will not be changed in color due to the presence in their compositions of the cerium oxide. Thus, an estimate of the integrated radiation flux to which the unit has been subjected can be obtained by visually determining which of the standard color glasses matches most closely the color in the adjacent pieces of sensitive glass. Conveniently, this may be done by viewing the assembly edgewise by transmitted light. Obviously, where the sensitive glass pieces do not exactly match any of the color standards, interpolation will provide an approximate measurement of the integrated intensity. Since the sensitive glass and comparison glasses are substantially unaffected by visible light, the visual comparison can readily be made at any time, and if desired, the device can be preserved to provide a relatively permanent record of the measured exposure to hard radiation.

Since each piece of sensitive glass 12 has directly adjacent thereto one of the standard color glasses, the ability of the eye to judge accuracy of color match is utilized to the fullest extent, and a much more accurate determination is possible than would be the case if the user had merely to estimate the absolute degree of discoloration in the sensitive material.

Fig. 2 of the drawing shows a modified form of the invention in which the lengths of the successive pieces of sensitive glass material 22, 24, 26 and 28 vary progressively from one end of the instrument to the other. Since the density of discoloration (as viewed edgewise of the glass pieces), is proportional to the depth of the discolored material, it is clear that the shorter pieces of exposed glass will be lighter in color (for a given amount of radiation) than would be full length pieces of the same composition. This arrangement thus permits extending the range of measurement considerably; thus, the amount of radiation required to make the shortest piece of glass 28 match the darkest standard color glass 20 will be several times that which would be needed if glass 28 were of full length.

The range of these radiation meters can be extended to the measurement of increased dosages by incorporating small percentages, from 0.001 to 1.0 per cent of cerium oxide in the radiation sensitive glass. In this manner greater amounts of radiation would be required to overcome the protecting effect resulting from the cerium oxide and to develop color in the sensitive glass. While this would also correspondingly reduce the sensitivity of the meter as to lower values of radiation, such fact would not be objectionable for many purposes.

Fig. 3 of the drawings illustrates a modified form which the invention may take in which a single long slip of sensitive glass 30 has mounted adjacent thereto successive smaller pieces 32, 34, 36 and 38 of the respective color comparison glasses; the color match between the uniformly discolored sensitive glass 30 and the corresponding standard color glass can readily be judged by viewing along the line separating the color standards from the sensitive material. The observation may be by transmitted light, as in the other embodiments described above, or the assembly may be provided with a reflecting backing (itself insensitive to radiations) so that the comparison can be made by light transmitted through the respective glass samples and then reflected backward to the eye of the observer.

For convenience in direct measurement, the respective samples or a mounting or casing associated therewith, can be marked with suitable values of irradiation. Also, the measuring units may be supplied with suitable clips or like fastening means for convenience where the device is to be worn upon the person of the user.

Other modifications of the invention will readily occur to those skilled in the art; for example, the variation in length of the sensitive glasses may be obtained by fabricating a single piece of the material as a wedge having thickness which varies along its length. Precise colors of the color standard glasses may be arrived at (to compensate, for example, for manufacturing tolerances) by controlling the length (in the direction from which it is to be viewed) of a glass having a known color-density per unit of thickness, and so on. The number of pieces of sensitive and comparison glass may be varied to obtain a desired gradation, the number shown in the drawings being merely exemplary.

While the invention itself, and a preferred way of practicing the same, have been disclosed in connection with certain preferred embodiments, the principles of the invention may also be carried out by specifically different structural assemblies, and it is to be understood that the invention is not limited to the details disclosed herein except as may be required by the scope of the appended claims.

What is claimed is:

1. A device for the integrated measurement of hard radiations lying outside the visible spectrum comprising a glass element characterized by discoloration by such irradiation, and a plurality of color standard members secured adjacent said element, said members being formed of a glass material insensitive to said radiation and having permanent graded colors corresponding to the visual color of said element produced by different values of irradiation.

2. A measuring instrument for determining the integrated intensity of hard radiations, comprising a material exhibiting a color change upon exposure to such radiation, and a comparison material insensitive to such radiation and having a color corresponding to the color of said first material after its irradiation by a predetermined quantity of said radiation, said materials being mounted adjacent one another for ready visual comparison of color match therebetween.

3. A glass composition suitable as a color standard for radiation dosimeters, comprising a glass having incorporated therein a material rendering the same insensitive to irradiation, and a predetermined quantity of a coloring material.

4. A glass composition in accordance with claim 3, in which said glass is a soda-lime-silica glass, and in which said coloring material comprises nickel oxide.

5. A glass composition in accordance with claim 3, in which said glass is a potassium-barium-borosilicate glass, and in which said coloring material is nickel oxide.

6. A glass composition in accordance with claim 4, in which said material rendering the composition insensitive to irradiation comprises cerium oxide.

7. A direct-reading portable dosimeter comprising an assembly of layers of a radiation-sensitive glass characterized by direct discoloration upon exposure to hard radiations, said layers alternating with layers of a glass insensitive to such radiation, the last-named layers being respectively colored to match the color produced in the first-named layers by varying quantities of such radiation, and means for securing said layers adjacent one another for visual comparison of color.

8. A direct-reading portable dosimeter in accordance with claim 7, in which the thicknesses in the direction of visual view of said sensitive layers are graded to correspond to desired standard color-densities thereof.

9. A direct-reading portable radiation dosimeter comprising an element formed of a soda-lime-silica glass showing a color change under irradiation, and fixedly secured thereto, a plurality of comparison pieces of a similar glass each incorporating a predetermined percentage of nickel oxide to provide therein color tints matching the colors produced in said element by different amounts of irradiation, and each of said pieces also incorporating about 1 percent of cerium oxide to render the colors of said comparison pieces insensitive to irradiation.

10. A direct-reading portable dosimeter comprising a plurality of elements formed of a soda-lime-silica glass showing a color change under irradiation, a plurality of comparison pieces of a similar glass alternating with and fixedly secured to said elements, each of said comparison pieces incorporating a predetermined percentage of nickel oxide to provide therein color tints matching the colors produced in said elements by different amounts of irradiation, and each of said pieces also incorporating about 1 percent of cerium oxide to render the colors of said comparison pieces insensitive to irradiation.

11. A direct-reading portable dosimeter comprising a laminated structure alternate layers of which comprise relatively thin pieces of a glass which is color-sensitive to irradiation, and the intervening layers of which comprise relatively thin pieces of the same glass in which are incorporated graded amounts of a coloring matter simulating the tints produced in such glass by irradiation, together with a material which renders said colored pieces of glass insensitive to color change under irradiation, whereby the integrated irradiation of said dosimeter may readily be observed visually by comparison of the colors of adjacent layers.

References Cited in the file of this patent

UNITED STATES PATENTS

| | | |
|---|---|---|
| 1,292,148 | Taylor | Jan. 21, 1919 |
| 2,223,118 | Miller | Nov. 26, 1940 |
| 2,527,693 | Armistead | Oct. 31, 1950 |
| 2,532,386 | Armistead | Dec. 5, 1950 |
| 2,614,944 | Lytle | Oct. 21, 1952 |
| 2,624,011 | Stern | Dec. 30, 1952 |
| 2,673,934 | Friedman | Mar. 30, 1954 |

FOREIGN PATENTS

| | | |
|---|---|---|
| 17,666 | Great Britain | Sept. 24, 1903 |